Aug. 5, 1924.

G. B. BABER 1,504,015

DETACHABLE CAM OR PULLEY

Filed June 29, 1923

INVENTOR.

G. B. Baber,

BY

Geo. F. Kimmel

ATTORNEY.

Patented Aug. 5, 1924.

1,504,015

UNITED STATES PATENT OFFICE.

GORDON B. BABER, OF GREENVILLE, SOUTH CAROLINA.

DETACHABLE CAM OR PULLEY.

Application filed June 29, 1923. Serial No. 648,515.

*To all whom it may concern:*

Be it known that I, GORDON B. BABER, a citizen of the United States, residing at Greenville, in the county of Greenville and State of South Carolina, have invented certain new and useful Improvements in Detachable Cams or Pulleys, of which the following is a specification.

This invention relates to detachable cams, pulleys or the like, and has for one of its objects to simplify and improve the construction and increase the efficiency and utility of devices of this character.

Another object of the invention is to provide a device of this character whereby a cam, pulley or the like, may be readily attached to or detached from a shaft without removing the shaft, and whereby the strains on the fastening means are materially reduced.

With these and other objects in view the invention consists in certain novel features of construction as hereinafter shown and described and then specifically pointed out in the claims, and in the drawings illustrative of the preferred embodiment of the invention—

Figure 1:
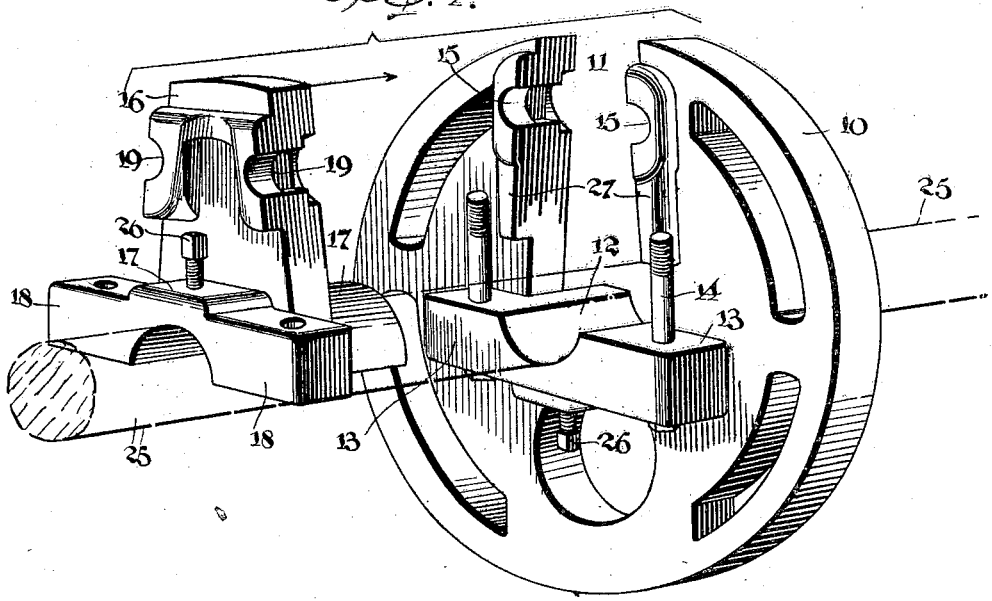
Figure 1 is a perspective view of the improved device with the parts disconnected.

The improved device may be adapted without material structural change for attaching cams, pulleys and the like, of various forms and sizes to shafts, or removing them therefrom, without disturbing the shaft or other parts connected therewith, but for the purpose of illustration is shown applied to a conventional cam of the class employed upon looms, the body of the cam being represented as a whole at 10 with a radial cavity or recess 11 opening through the margin of the body and with the side walls of the cavity converging toward the open outer end. At the inner or diverging end of the cavity a half bearing 12 is formed, the half bearing having laterally directed attaching lugs 13 apertured to receive clamp bolts 14. Near their outer ends the outwardly converging sides of the cavity are formed with inwardly opening bolt receiving recesses 15.

A filler member, represented as a whole at 16 and having converging sides to correspond to the converging sides of the body cavity, is adapted to be inserted in the latter and closely engage the same, and is provided with an opposing half bearing 17 at its inner end to engage the half bearing 12 and with laterally directed attaching lugs 18 to engage the attaching lugs 13 of the body and be secured thereto by the connecting bolts 14.

Figure 2:
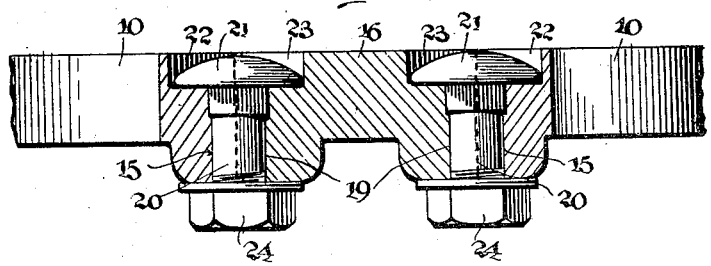
Fig. 2 is an enlarged sectional detail.

Near its upper end the filler member 16 is provided with outwardly opening recesses 19 coacting with the recesses 15 to receive clamp bolts 20, the bolts having heads 21 at one end to fit in half seats 22 and 23 in the adjacent portions of the body 10 and filler member 16, and with clamp nuts 24 at the other ends, as shown in Fig. 2.

The shaft upon which the improved device is coupled is indicated by broken lines at 25 in Fig. 1, and the half bearings 12 and 17 are provided respectively with set screws 26 to couple the body for rotation with the shaft. The body 10 is formed with strengthening ribs 27 whose lower ends extend over the attaching lugs 18 of the filler member when the parts are united, and thus coact with the inclined sides of the filler member and body to receive the outward thrust of the filler member and relieve the clamp bolts 14 and 20 largely from strain.

The principal strains are outwardly from the shaft, and the outwardly converging sides of the recess 11 and filler member 16 receive the outward thrust, and prevent undue strain upon the clamp bolts, while at the same time the clamp bolts effectually hold the filler member from displacement longitudinally of the shaft.

The improved device is simple in construction, can be constructed of any size or adapted to pulleys or cams of various forms, but as before stated is more particularly adapted to the cams employed in looms of various constructions.

The preferred embodiment of the invention is disclosed in the drawings and set forth in the specification, but it will be understood that modifications within the scope of the claims may be made in the construction without departing from the principle of the invention or sacrificing any of its advantages.

Having thus described the invention, what is claimed as new is:—

1. A pulley comprising a body having a radial cavity with the sides thereof converging throughout towards the outer edge of said body, said body further having means to provide an integral half bearing at the inner end of the cavity, said half bearing including integral lateral attaching lugs extending over the adjacent face of the body at one side thereof, a filler member seated in said cavity and having the sides thereof converging to conform to the converging sides of the cavity to arrest centrifugal thrust of said member on the operation of the pulley, said member having an integral half bearing at its inner end opposing the other half bearing and including integral lateral attaching lugs extending over the adjacent faces of the pulley body and seating upon the attaching lugs of the half bearing of the body, fastening means connecting the attaching lugs of the half bearings together, and fastening means for connecting the filler member to the body.

2. A pulley comprising a body having a radial cavity with the sides thereof converging throughout toward the outer edge of said body, a reinforcing rib integral with the body upon each marginal edge of said cavity and flush with the inner face of the converging side walls thereof, an integral half bearing at the inner end of the cavity and spaced from the ends of said ribs, the face of said converging sides and ribs having inwardly opening semi-circular bolt receiving seats therein, a filler member seated in said cavity and having the sides thereof converging to conform to the converging sides of the cavity to arrest centrifugal thrust of said member on the operation of the pulley, an integral half bearing at the inner end of said member opposing the other half bearing between the upper face of the same and the inner ends of said reinforcing ribs, reinforcing ribs upon one face of said filler and flush with each side thereof, said converging sides of said filler and said ribs having semi-circular bolt receiving seats therein opposing said first mentioned seats, fastening means connecting the half bearings, and clamp bolts engaging in said semi-circular seats and connecting the filler member to the body.

In testimony whereof, I affix my signature hereto.

GORDON B. BABER.